(12) United States Patent
Barr et al.

(10) Patent No.: US 12,554,876 B2
(45) Date of Patent: Feb. 17, 2026

(54) POLICY-BASED DATA STORE ACCESS AUTHORIZATION

(71) Applicant: T-Mobile Innovations LLC, Overland Park, KS (US)

(72) Inventors: Jay R. Barr, Canton, GA (US); Manoj Sukumaran, Snohomish, WA (US)

(73) Assignee: T-Mobile Innovations LLC, Overland Park, KS (US)

( * ) Notice: Subject to any disclaimer, the term of this patent is extended or adjusted under 35 U.S.C. 154(b) by 0 days.

(21) Appl. No.: 18/761,268

(22) Filed: Jul. 1, 2024

(65) Prior Publication Data

US 2026/0003994 A1    Jan. 1, 2026

(51) Int. Cl.
*G06F 21/00* (2013.01)
*G06F 21/62* (2013.01)

(52) U.S. Cl.
CPC ............................... *G06F 21/6227* (2013.01)

(58) Field of Classification Search
None
See application file for complete search history.

(56) References Cited

U.S. PATENT DOCUMENTS

| | | | | |
|---|---|---|---|---|
| 1,922,162 | A | * | 8/1933 | King ........................ H01J 7/186 445/41 |
| 10,832,246 | B2 | | 11/2020 | Novac et al. |
| 2009/0319489 | A1 | * | 12/2009 | Saaranen ............. H04N 21/241 |
| 2010/0100924 | A1 | * | 4/2010 | Hinton .................... G06F 21/10 726/1 |
| 2011/0060995 | A1 | * | 3/2011 | Whalen ............... H04L 41/0894 726/1 |
| 2014/0012740 | A1 | | 1/2014 | Carson et al. |
| 2021/0241240 | A1 | | 8/2021 | Lyver et al. |
| 2021/0248143 | A1 | * | 8/2021 | Khillar ................ G06F 16/2379 |
| 2021/0342480 | A1 | * | 11/2021 | Kogan .................. G06F 16/156 |
| 2022/0012363 | A1 | * | 1/2022 | Colcord ............... G06F 9/3005 |
| 2023/0138971 | A1 | * | 5/2023 | Krishnan .............. G06F 16/211 707/797 |

(Continued)

OTHER PUBLICATIONS

Office Action dated Sep. 23, 2025, U.S. Appl. No. 18/801,641, filed Aug. 12, 2024.

*Primary Examiner* — Maung T Lwin

(57) ABSTRACT

A method of providing access to a data store. The method comprises receiving a request for authorization of access to a data store by a broker application, wherein the request comprises information a client identity and an identity of requested data; formatting a policy management authorization request according to a policy management application format; sending the policy management authorization request to an policy management application; looking up one or more authorization policies by the policy management application, evaluating the policy management authorization request by the policy management application based on the looked up policies; sending an authorization response by the policy management application to the broker application, wherein the authorization response is formatted according to the policy management application format; receiving the authorization response by the broker application from the policy management application; and sending one of an affirmative authorization response or a negative authorization response by the broker application.

20 Claims, 11 Drawing Sheets

(56) References Cited

U.S. PATENT DOCUMENTS

| | | | |
|---|---|---|---|
| 2023/0205898 A1* | 6/2023 | Venable | G06F 21/6227 |
| | | | 726/26 |
| 2023/0359667 A1* | 11/2023 | Zionts | G06F 16/9024 |
| 2023/0419283 A1* | 12/2023 | Le | G06Q 30/04 |
| 2024/0403138 A1* | 12/2024 | Sabhanatarajan | G06F 9/541 |
| 2025/0117316 A1* | 4/2025 | Bhupathi | G06F 11/3698 |

\* cited by examiner

POLICY-BASED DATA STORE ACCESS AUTHORIZATION

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Financial institutions may be victimized by persons opening accounts to defraud the institutions in some way. This may happen, for example, when the person opening an account with an institution provides inaccurate information about themselves that makes them appear to be a good credit risk when in fact they are a poor credit risk. By the time the financial institution has direct experience with this person who has opened an account with inaccurate information, the person may have exploited the institution to purchase goods with credit extended by the institution that the person will not pay back.

SUMMARY

In an embodiment, a system for providing centralized policy-based authorization for access to a data store is disclosed. The system comprises a data store, wherein the data store is accessed by a plurality of GraphQL subgraphs; an at least one processor; a non-transitory memory, wherein the non-transitory memory comprises a plurality of multi-level authorization policy definitions that define access to the data store based on client identities, based on operations, based on data types, and based on fields; a router application stored in the non-transitory memory; a broker application store in the non-transitory memory, and a policy management application stored in the non-transitory memory. When executed by at least one processor, the router application receives requests to perform operations on the data store from client applications, sends information about the requests to a broker application, receives authorization decisions from the broker application, for a first plurality of the received requests to perform operations that are associated with affirmative authorization decisions, sends the received requests on to a GraphQL subgraph of the data store, and for a second plurality of the received requests to perform operations that are associated with negative authorization decisions, sends request denial messages to the associated client applications. When executed by the processor, the broker application receives the information about the requests to perform operations on the data store from the router application, formats authorization requests in the format required by the policy management application, wherein the authorization requests comprise information identifying client applications and requested data, sends the authorization requests to a policy management application, receives affirmative authorization decisions from the policy management application for the first plurality of the received requests to perform operations, sends affirmative authorization decisions for the first plurality of received requests to perform operations to the router application, receives negative authorization decisions from the policy management application for the second plurality of received requests to perform operations, and sends negative authorization decisions for the second plurality of received requests to perform operations to the router application. When executed by at least one processor, the policy management application receives requests to authorize requests from the broker application, analyzes each of the authorization requests based on the client applications and requested data and based on the plurality of authorization policy definitions, sends affirmative authorization decisions associated with the first plurality of received requests to perform operations to the broker application, and sends negative authorization decisions associated with the second plurality of received requests to perform operations to the broker application.

In another embodiment, a method of providing centralized policy-based authorization for access to a data store is disclosed. The method comprises receiving a request for authorization of access to a data store by a broker application executing on a computer system, wherein the request comprises information, a client identity and an identity of requested data; formatting a policy management application authorization request according to the policy management application format, wherein the policy management authorization request comprises the identity of the client and the identity of requested data; sending the policy management authorization request to a policy management application executing on a computer system; and looking up one or more authorization policies by the policy management application based on the identity of the client and based on the identity of requested data. The method further comprises evaluating the policy management authorization request by the policy management application based on the looked up one or more policies; sending an authorization response by the policy management application to the broker application, wherein the authorization response is formatted according to the policy management application format; receiving the authorization response by the broker application from the policy management application; and sending one of an affirmative authorization response or a negative authorization response by the broker application.

In yet another embodiment, a system for providing centralized policy-based authorization for access to a data store is disclosed. The system comprises a data store; an at least one processor; a non-transitory memory, wherein the non-transitory memory comprises a plurality of authorization policy definitions; a gateway application stored in the non-transitory memory; a broker application store in the non-transitory memory; and a policy management application stored in the non-transitory memory. When executed by at least one processor, the gateway application receives requests to perform operations on the data store from client applications, sends information about the requests to a broker application, receives authorization decisions from the broker application, for a first plurality of the received requests to perform operations that are associated with affirmative authorization decisions, sends the received requests on to the data store, and for a second plurality of the received requests to perform operations that are associated with negative authorization decisions, sends request denial messages to the associated client applications. When executed by at least one processor, the broker application receives the information about the requests to perform operations on the data store from the gateway application, formats authorization requests in the policy management application format, wherein the authorization requests comprise information identifying client applications and requested data, sends the authorization requests to a policy management application, receives affirmative authorization decisions from the policy management application for the first plurality of the received requests to perform operations, sends affirmative authorization decisions for the first plurality of received requests to perform operations to the gateway application, receives negative authorization decisions from the policy management application for the second plurality of received requests to perform operations, and sends negative authorization decisions for the second plurality of received requests to perform operations to the gateway application. When executed by at least one processor, the policy management application receives requests to authorize requests from the broker application, analyzes each of the authorization requests based on the client applications and requested data and based on the plurality of authorization policy definitions, sends affirmative authorization decisions associated with the first plurality of received requests to perform operations to the broker application, and sends negative authorization decisions associated with the second plurality of received requests to perform operations to the broker application.

In yet another embodiment, a method of fraud prevention supported by providing information on subscribers by a telecommunication service provider based on subscriber accounts is disclosed. The method comprises receiving a plurality of requests from partner institutions by an application programming interface (API) of a gateway application executing on a computer system, wherein different ones among the plurality of requests identify different sets of information about subscribers of the telecommunication service provider and mediating requests that identify different sets of information about subscribers by the gateway application to different method calls on a subscriber information data store. The method further comprises receiving responses from the subscriber information data store by the gateway application, translating the information about subscribers by the gateway application to provide filtered information that protects confidential information of subscribers, and sending responses comprising filtered information about subscribers by the API of the gateway application to the partner institutions based on the requests, whereby the partner institutions are able to determine risk assessments of the subscribers based on the filtered information, whereby the partner institutions are enabled to reduce fraud perpetrated on the partner institutions by individuals illicitly posing as subscribers of the telecommunication service provider. The method further comprises sending a log about each of the responses to the partner institutions, wherein each log identifies a subscriber identified in the associated request received from the partner institution, identifies the partner institution, and identifies the method call on the data store executed by the gateway application based on the associated request received from the partner institution by the gateway application to a transaction recording application executing on a computer system and processing the logs by the transaction recording application to produce records based on a plurality of policies, wherein the policies define how records on requests from different partner institutions are to be recorded.

In yet another embodiment, a system for providing information on subscribers by a telecommunication service provider based on subscriber accounts is disclosed. The system comprises an at least one processor, a non-transitory memory, a gateway application stored in the non-transitory memory, and a recording application stored in the non-transitory memory. When executed by the at least one processor, the gateway application extends an application programming interface (API) to a plurality of partner institutions, receives a plurality of requests from partner institutions via the API, wherein different ones among the plurality of requests identify different sets of information about subscribers of the telecommunication service provider, and translates the information about subscribers to provide filtered information that protects confidential information of subscribers. The gateway application also sends responses comprising the filtered information about subscribers via the API to the partner institutions based on the requests, whereby the partner institutions are able to determine risk assessments of the subscribers based on the filtered information, whereby the partner institutions are enabled to reduce fraud perpetrated on the partner institutions by individuals illicitly posing as subscribers of the telecommunication service provider; sends a log about each of the responses to the partner institutions to the transaction recording application, wherein each log identifies a subscriber identified in the associated request received from the partner institution; identifies the partner institution, and identifies the method call on the data store executed by the gateway application based on the associated request received from the partner institution by the gateway application. When executed by the at least one processor, the transaction recording application processes the logs by the transaction recording application to produce records based on a plurality of policies, wherein the policies define how records on requests from different partner institutions are to be recorded.

In yet another embodiment, a method of providing information on subscribers by a telecommunication service provider based on subscriber accounts is disclosed. The method comprises receiving a plurality of requests from partner institutions by an application programming interface (API) of a gateway application executing on a computer system, wherein different ones among the plurality of requests identify different sets of information about subscribers of the telecommunication service provider and sending responses to the requests comprising filtered information about subscribers by the API of the gateway application to the partner institutions based on the requests, whereby the partner institutions are able to determine risk assessments of the subscribers based on the filtered information. The method further comprises sending a log about each of the responses to a transaction recording application executing on a computer system, wherein each log identifies a subscriber identified in the associated request received from the partner institution, identifies the partner institution, and identifies the method call on the data store executed by the gateway application based on the associated request received from the partner institution by the gateway application and processing the logs by the transaction recording application to produce transaction records based on a plurality of policies, wherein the policies define how records on requests from different partner institutions are to be recorded and wherein the transaction records are stored in a transaction records data store table. The method further comprises processing the transaction records stored in the transaction records data store table by the transaction recording application to generate a summarized transaction records data store table that comprises transactions summaries, transmitting the summarized transaction records to the partner institutions by the transaction recording application, and conducting an audit of a summarized transaction record by the transaction recording application, wherein the transaction recording application substantiates the summarized transaction record by information stored in the transaction records data store table.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
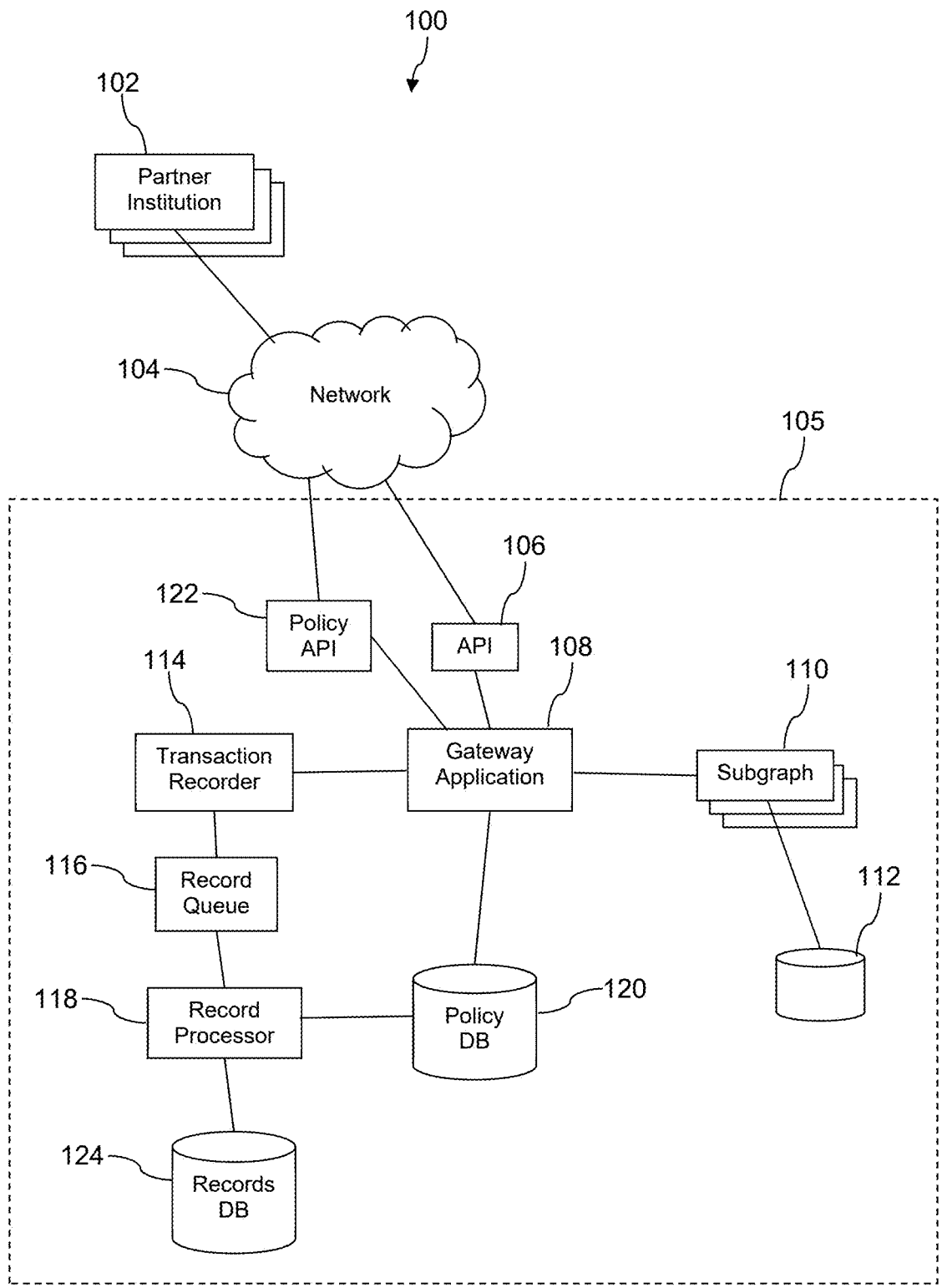
FIG. 1 is a block diagram of a system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Authentication is the process of determining that a client requesting services is who the client claims to be. Authorization is the process of determining what kind of access is granted to a client based on who that client is and/or based on contextual factors. A database management system may desirably compartmentalize a large database into a plurality of sub-databases. For example, a GraphQL system may compartmentalize a database (e.g., a graph) into a plurality of sub-graphs. In some embodiments, a federated GraphQL API management system may authenticate clients requesting access to the database system but may delegate to sub-databases the task of authorizing access to the given sub-database. This decentralized authorization approach may suffer from a variety of disadvantages including extra burden on each of the sub-databases, decreased maintainability of authorization software, and inconsistent authorization policies. The present disclosure teaches a system that provides centralized fine-grained, context-aware authorization. While a use case for this system is described in the context of a federated GraphQL API management system, it is understood that the same approach may be advantageously applied for other kinds of database management systems that compartmentalize a large database into a plurality of sub-databases.

In an embodiment, a broker application mediates between a policy management application and the client database access pathway to perform authorization before passing a client request to access the datastore on to a subgraph. For example, a client request may be received by an application programming interface (API) of a gateway application, the gateway application may authenticate the client, the gateway application may forward the client request (if the client passes authentication successfully) on to a route application. The router application may send some of the information about the client request to the broker application. The broker application may adapt the client request to a form compatible with the policy management application and send an authorization request to the policy management application. The policy management application may authorize (or reject if the request is not authorized) the client request based on a pre-defined set of policies and a context of the request. The policy management application sends the authorization finding back to the broker application. The broker application then commands the router to allow forward the client request on to the appropriate sub-graph or sub-graphs or to send a reject message to the client.

In this system, the broker may be said to enforce the authorization policy decisions while the policy management application acts as a policy-based decision engine. This system externalizes policy decisions outside of the router and the GraphQL datastore system. Because of the externalization of policy decisions and enforcement in this way, this system is easily maintained. The authorization decision making can readily be adapted simply by revising a file or a plurality of files that define the context-based authorization policies. Said in other words, the authorization decision making is data driven. When a new context-based authorization policy is deployed, only one or more files read by the policy management application need to be modified. The adapted policy can be acted upon on the very next client request. By contrast, delegating the authorization decision making and enforcement to the sub-graphs or database sub-databases may likely embody the decision-making definition in software, in which case adaptation of authorization policy would likely entail deploying a software update to one or more of the sub-graphs or database sub-databases. Such software updates are notoriously subject to glitches and errors that can degrade access to the database. Thus, to avoid such glitches and errors, the software update process is time consuming and tedious to assure such glitches and errors do not occur. This makes the maintaining the authorization policies of such a system time consuming and expensive and subject to errors.

In an alternative embodiment of the centralized authorization system described herein, the broker application may be embedded in the gateway application and may make a go/no-go decision before a client request is ever forwarded by the gateway application to the router application.

In an embodiment, the centralized, fine-grained, context-based authorization system described above may desirably be deployed in a system for providing risk assessment information to clients. It is understood, however, that the authorization system may be applied advantageously to other use cases not limited to the risk assessment use case described herein below. Institutions seeking to increase participation in their services may be vulnerable to attempts to defraud the institution by new participants, for example new account holders and/or new customers for a service provided by the institution. The present disclosure teaches an information sharing system that provides information on individuals that may enable institutions to better evaluate a risk of potential new participants or customers. Particularly, a wireless communication service provider may be able to provide information related to a subscriber of the service provider to the institution that can be used to evaluate a risk associated with that potential new participant or customer.

The information may be adapted to avoid providing any confidential or sensitive information about the subscriber of the wireless communication service provider to the institutions. This information can include confirmation or denial that an individual has a subscription account with the wireless communication service provider. This information can include an indication that the subscription of the individual is active, is suspended, or is canceled. This information can include an indication of whether the phone associated with the individual is reported as lost or stolen or not so reported. This information can include an indication of whether the phone associated with the individual has call forwarding turned off or turned on. This information can include an indication of when the international mobile equipment identity (IMEI) of the phone associated with the individual was placed into service. This information can include an indication of a coarse-grained age category that the subscriber belongs to. This information can include a zip-code of the postal address of the subscriber. In an embodiment, however the information may not provide any demographic information about the individuals (e.g., not include age related information or postal address related information). It may be the information provided by the wireless communication service provider to the institutions promotes avoidance of a cyber criminal stealing the identity of a legitimate subscriber of the service provider by spoofing this individual to open an account with the institution, running up a bill on the account, defrauding that institution by not paying a bill, and leaving the legitimate subscriber whose identity was stolen with a damaged credit rating. Thus, the subscriber of the wireless communication service provider may be benefitted by the sharing of such non-confidential and obfuscated information to the institutions.

Different institutions may desire a different mix of information to be provided by the wireless communication service provider. These different mixes of information may be retrieved from one or more data stores of the service provider by executing a different method or computer function for each different mix of information. This may be the case, for example, when a federated GraphQL API management system is employed to store and access information about subscribers of the wireless communication service provider. In an embodiment, therefore, the institutions may invoke different application programming interfaces (APIs) extended by the wireless communication service provider to external partners (e.g., institutions which have arranged for such access to information with the wireless communication service provider). In some instances, the same external partner may wish to request different amounts or kinds of information from the wireless communication service provider in different circumstances—for different individuals and/or for different types of accounts. But developing automated programs by external partners to dovetail with these different APIs can be onerous and even deter participation of some potential external partners. The present disclosure teaches a system and method that overcomes this technical problem with a specific technical solution that enables participating institutions (e.g., external partners) to use a single API to request any mix of information from the wireless communication service provider desired on any given occasion. This may be referred to in some contexts as an "a la carte" system. The system also provides for bundled access which comprises a statically defined mix of information about subscribers that a given external partner may typically desire to receive.

The system of information sharing disclosed herein provides a single API entrance point that external partners or participating institutions access. This API may be part of a gateway application that executes on a computer system of the wireless communication service provider. The gateway application may map or mediate different invocations of the API to different internal methods or internal APIs (internal in the sense that the methods and/or APIs are accessed by applications and/or systems within the domain of the wireless communication service provider) that are executed to look up the specific information requested via the API by the external partners. Invocations of the API may be different, for example, by identifying in their argument portion different mixes of desired information and/or a statically defined information bundle. The gateway application then invokes the appropriate methods and/or internal APIs to retrieve the desired information from one or more data stores maintained by the wireless communication service provider. The gateway application may process the detailed information it has received to make filtered information that is suitable for sharing with the external partners. This process of making filtered information based on the detailed information may be referred to as abstracting the detailed information or making the detailed information more coarse-grained. This may be accomplished by transforming a specific age of a subscriber to a broad age category. This may be accomplished by curtailing a specific residential address to only the zip-code associated with that residential address. The gateway application then returns the filtered information to the external partner who requested it.

The external partner is free to analyze the abstracted information as they see fit, but it is assumed most external partners will use their own proprietary risk assessment software that they have developed to determine a risk associated with the received abstracted information. If such a partner calculates a risk to be above a first threshold, they may reengage with the subject candidate account holder to obtain more identity establishing information or proof. If such a partner calculates the risk to be above a second threshold, where the second threshold is higher than the first threshold, they may simply deny the request of the candidate to open an account with the subject institution.

The response of the gateway application to the request from the external partner may be deemed a synchronous transaction in the sense that the request for information is presented by the external partner to the API extended by the gateway application, and the API returns a response to the external partner in a single communication session. This may be viewed as a single transaction where a response is obtained immediately (e.g., within less than 1 minute, less than 30 seconds, less than 10 seconds, or some other relatively short duration of time).

Using an asynchronous process, the gateway application may create a log recording the particulars of the given API transaction and send the log to a transaction recording application that executes on a computer system, and the transaction recording application may create records associated with the log that are stored in a transactions records data store. In an embodiment, basic information about a given invocation of the API by an external partner is sent by the gateway application to a transaction recorder service. The transaction recorder service may publish the API invocation information as transaction information to a transaction record queue for temporary storage. A transaction record processor service may subscribe to the transaction record queue to receive the transaction information and receive notifications when such transaction information is available. The transaction record processor retrieves the transaction information at a pace and at a time that accords with its processing capacity. Thus, the transaction record processor may be processing transaction information well after the transaction between the external partner and the API has completed, for example ten minutes after, thirty minutes after, an hour after, two hours after, three hours after, six hours after, or some other later time less than seven days. It is for this reason that the transaction recording application may be said to proceed using an asynchronous process.

The transaction record processor may process transaction information based on policies defined by a transaction recording policy defined by a transaction policy configuration service. The transaction policy configuration service may extend an API to external partners and/or to personnel of the wireless communication service provider to be used to define policies for processing transactions to produce transaction records. The record processing policies defined through that API may be stored in a recording policy data store accessible to the transaction record processor. Different policies may be defined for different external partners. Different transaction recording policies may be defined for different sub-groups or different departments within a single external partner.

In an embodiment, the transaction recording application comprises the transaction recorder service, the transaction record queue, the transaction record processor service, the transaction recording policy configuration API, the transaction recording policy data store, and the transaction records data store. In another embodiment, however, the transaction recording application may provide similar functionality but be implemented having a different architecture comprising different component parts than those identified here.

The recording policies define different access allowed to external partners. The external partners, knowing these recording policies, may manage their access to the API of the gateway application accordingly. The wireless communication service provider may monitor the records generated by the transaction record processor service to confirm that the external partners are indeed abiding by the recording policy defined for the external partners. The transaction recording policies may define bundled transaction access (e.g., a statically defined mix of information that an external partner may foresee it would often wish to request in many or most cases). The transaction recording policies may define a la carte transaction access (e.g., a free-form mix of information that may be defined ad hoc at the time of a given request addressed to the API of the gateway by an external partner). In an embodiment, the transaction recording policies may comprise rating information. For example, in an embodiment, the transaction recording policies may define fees for the use of the API of the gateway.

Turning now to FIG. 1, a system 100 is described. In an embodiment, the system 100 comprises a plurality of partner institutions 102, a network 104, and a gateway application 108 that extends an application programming interface (API) 106 for use to the partner institutions 102. In an embodiment, the API 106 may be referred to as an external information request API (i.e., an externally facing API that supports information requests from external partners). In an embodiment, the system 100 further comprises a plurality of subgraphs 110 and a data store 112. The data store 112 comprises data about subscribers of a wireless communication service provider and may comprise a plurality of different data stores and/or data structures. The subgraphs 110 may be provided by a federated GraphQL API management system and may provide different methods or APIs for gaining access to the data store 112. GraphQL provides a declarative way to get data. The federated GraphQL API management system may establish an abstract supergraph which is the federation of the subgraphs 110. Thus, the GraphQL may be said to establish a federated data store based on the data store 112 and the layers of database management software used to access the data store 112. In some contexts, these different APIs may be referred to as internal subscriber information APIs (i.e., internally facing APIs that support accessing information about subscribers of the wireless communication service provider). The subgraphs 110 may each provide a REST API for accessing the data schema associated with the given subgraph 110. In another embodiment, a different data base management system than GraphQL is used and some different access methods are provided to access the data store 112. The network 104 comprises one or more public networks, one or more private networks, or a combination thereof. The network 104 may in part be implemented by the communication system 550 described herein below with reference to FIG. 7A and FIG. 7B.

The system 100 further comprises a transaction recorder service 114, a transaction record queue 116, a transaction record processor service 118, a transaction recording policy data store 120, a transaction recording policy configuration API 122, and a transaction record data store 124. The collectivity of the transaction recorder service 114, the transaction record queue 116, the transaction record processor service 118, the transaction recording policy data 120, the transaction recording policy configuration API 122, and the transaction record data store 124 may be referred to in some contexts as a transaction recording application. In an embodiment, the transaction recorder service 114 and the transaction record processor service 118 may be implemented using open source Java Springboot.

The API 106, the gateway application 108, the subgraphs 110, the data store 112, the transaction recorder service 114, the transaction record queue 116, the transaction record processor service 118, the transaction recording policy data store 120, the transaction recording policy configuration API 122, and the transaction record data store 124 may all be disposed within a network domain 105 of a wireless communication service provider. The API 106, the gateway application 108, the subgraphs 110, the transaction recorder service 114, the transaction record queue 116, the transaction record processor service 118, and the transaction recording policy configuration API 122 may all be provided by software that executes on a computer system. The data store 112, the policy data store 120, and the transaction record data store 124 may be implemented on a computer system, for example based on data base management system software executing on computer systems. The partner institutions 102 may interact with the API 106 via computer systems disposed in network domains managed by the partner institutions. Computer systems are described further hereinafter. In an embodiment, the API 106, the gateway application 108, the subgraphs 110, the data store 112, the transaction recorder service 114, the transaction record queue 116, the transaction record processor service 118, the transaction recording policy data store 120, the transaction recording policy configuration API 122, and the transaction record data store 124 may all be located inside of a containerized application virtualization environment (e.g., a Kubernetes pod).

The partner institution 102 (e.g., an employee of a partner institution using a workstation or an application executing on a computer within the partner institution) sends a request for information about a specific individual identifying that individual via the API 106. The gateway application 108 receives the request from the API 106 and maps the request to one or more of the subgraphs 110 or internally facing APIs. The subgraphs 110 will look up the needed information from the data store 112 and return to the gateway application 108.

The gateway application 108 filters the information and transforms it so that it is does not contain confidential information unsuited for promulgation outside of the wireless communication service provider. A variety of filtering of information is contemplated by the present disclosure. Filtered information may include an indication that the identified individual does or does not have a subscription account with the wireless communication service provider. In an embodiment, that information may be that the individual does not have an account, the individual has an account in good standing, or the individual has an account that is frozen or otherwise not in good standing. In an embodiment, the information may contain an indication that the subscription of the individual is active, is suspended, or is canceled. In an embodiment, the information may contain an indication that a phone of the subscriber is reported as lost or stolen or as not so reported. In an embodiment, the information may contain an indication of whether a phone associated with the subscriber is in a call forwarding mode of operation. In an embodiment, the information may contain an indication of when the IMEI of a phone associated with the subscriber was placed into service. Information about an age of an individual may be suppressed and instead an indication of a broad age category may be returned to the requesting partner institution 102. For example, the subscriber age may be indicated to be a juvenile age category (ages up to 21 years of age), young adult age category (ages 21 years of age to 40 years of age), middle-aged adult age category (40 years of age to 60 years of age), and senior age category (above 60 years of age). Alternatively, the subscriber age may be indicated as to what decade of life the subscriber is in. Information about a permanent address of the subscriber may be represented by a zip-code or by a state and county location. Again, of course, the partner institutions 102 may invoke the API 106 with different parameters that elicit a different mix of information being returned to the partner institutions 102.

The gateway application 108 sends the filtered information back to the requesting partner institution 102. It is understood that the gateway application 108 may be receiving a large number of information requests from partner institutions 102 concurrently. The gateway application 108 may extend multiple executing instances of the API 106 so that requests from partner institutions 102 do not experience a bottle neck passing through a single instance of the API 106. The gateway application 108 itself may be implemented as multiple instances of the same application software executing on one or more computers concurrently.

The gateway application 108 captures information about the transactions completed with the partner institutions 102 in the form of transaction logs. These transaction logs may identify the identity of the individual who was the subject of the information request (e.g., identify the subscriber of the wireless communication service provider), a time of the request for information, a type of request (what mix of information was requested), and other metadata. The transaction log may indicate a success or failure of the request for information. The transaction log may or may not indicate the actual results of the information request that were sent back to the requesting partner institution 102. The gateway application 108 sends each of the transaction logs to the transaction recording application, for example to the transaction recorder service 114. The transaction recorder service 114 may place each of the transaction logs as it receives them onto the transaction record queue 116. In an embodiment, the transaction record queue 116 may be implemented as a Kafka queue. The transaction recorder service 114 may operate in a synchronous way, as it is triggered and takes action based on the trigger pursuant to the integrated transaction completed between the partner institution 102 and the gateway application 108. Later processing of the transaction logs placed on the transaction record queue 116 may be viewed as asynchronous. For this reason, the processing of the transaction recording application may be viewed as for the most part asynchronous.

The transaction record queue 116 may send a notification to the transaction record processor service 118, and the transaction record processor service 118 may then retrieve the associated transaction record from the transaction record queue 116. Alternatively, the transaction record processor service 118 may occasionally ask the transaction record queue 116 if there is one or more transaction records waiting to be retrieved and do that when there are pending transaction records. This may be referred to as a polling process in some contexts. In an embodiment, the interactions between the transaction record queue 116 and the transaction record processor service 118 may be conducted according to a publish-subscribe arrangement.

The transaction record processor service 118 creates records based on the transaction record logs retrieved from the transaction record queue 116. These records may be stored in the transaction record data store 124. The records stored in the transaction record data store 124 may be used by the wireless communication service provider to assess an extent to which a partner institution 102 is operating within the terms of the arrangement that has been agreed upon between them. This may be a matter of not exceeding a pre-defined number of requests for information per unit of time (e.g., less than 1,000 requests per week, less than 10,000 requests per week, of some other limited number of requests). The transaction record data store 124 may be used by the wireless communication service provider to settle up fees paid by the partner institutions 102 to the wireless communication service provider in consideration of the valuable information provided via this system to the partner institutions 102. In an embodiment, one or more partner institution 102 may desire to audit or to initiate an audit of the transaction records stored in the transaction record data store 124 to substantiate the findings of the wireless communication service provider.

Figure 2:
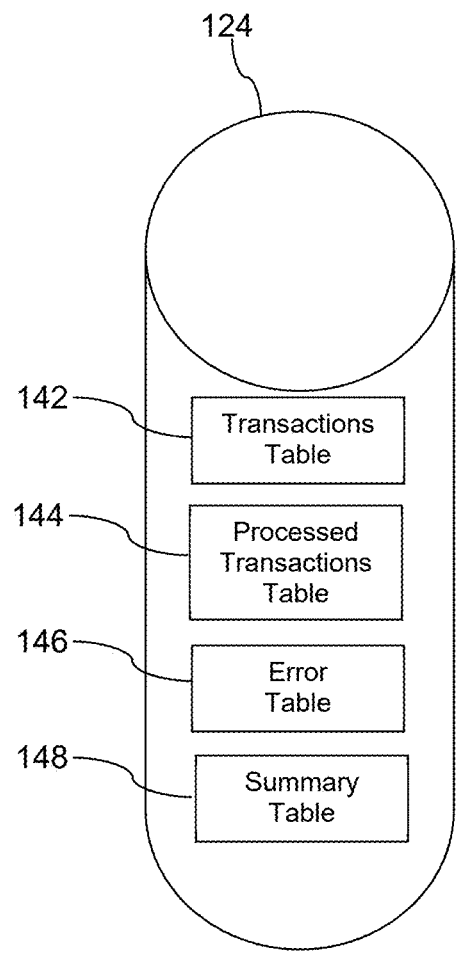
FIG. 2 is a block diagram of a record data store according to an embodiment of the disclosure.

Turning now to FIG. 2, an embodiment of the transaction recording data store 124 is described. In an embodiment, the transaction recording data store 124 may comprise a plurality of tables that represent the transaction records generated by the transaction record processor service 118 in different forms or levels of details. In an embodiment, the transaction recording data store 124 may comprise a transactions table 142, a processed transactions table 144, an error table 146, and a summary table 148. The transaction record processor service 118 may write the transaction records into the transactions table 142. The entries in the transactions table 142 may be considered the "source of truth" in the transaction recording data store 124. As such, the entries in the transactions table 142 may be audited in concert between the wireless communication service provider and a partner institution 102 to substantiate processing results proffered by the wireless communication service provider.

The transaction processor service 118 may analyze the transaction records to produce processed transactions that are stored in the processed transactions table 144. The transaction processor service 118 references the policies stored in the policy data store 120 and processes the transaction records in the light of these policies and/or rate cards. In an embodiment, the policies may in part define rate cards that define how to process transaction records based on the partner institution, based on a sub-group within a given partner institution, based on what specific fields of information about a subscriber was requested, and/or based on a status of the transaction (e.g., was a result returned by the API 106 to the partner institution 102 or was the result of an error or invalid response). Each different rate card may associate to or be selected according to a specific combination of partner institution, sub-group, and set of fields of information requested. Each rate card may define one or more levels of access granted to the partner institution or sub-group of the institution. Each rate card may define a fee schedule for the associated information access. The transaction processor service 118 may compare the transaction records against the rate cards sequentially. In an embodiment, the rate cards may be configured as JSON files.

The entries in the processed transactions table may be too voluminous or dispersed to be suitable for ordinary analysis and communication between the wireless communication service provider and the partner institutions 102. The transaction record processor service 118 or another component may accordingly periodically comb through the entries in transaction table 142 to produce rolled up summaries of the individual records that are stored in the summary table 148. For example, the transaction record processor service 118 or other component may produce summaries of the processed transactions associated with each partner institution and store these summaries in the summary table 148. In an embodiment, these summaries may take the form of a fee invoice. In an embodiment, these summaries may represent an accumulation of fees over a periodic invoicing period. For example, the summaries may be sum in a current day's fees with previously accumulated fees associated to the same partner institution 102 of the current billing cycle. At the end of the billing cycle, this summary may be used to ultimately invoice the partner institutions 102. While the language here is framed in terms of billing and payment, it is clear that the rating and summaries may be simply related to agreed upon usage targets which could be used by the wireless communication service provider and the partner institutions 102 to reconcile forecast usage volumes with actual usage volumes.

The processing by the transaction record processor service 118 or other component to produce the processed transaction records can be changed in real-time simply by modifying the rate card and/or policies stored in the policy data store 120. After a policy or rate card has been modified, when the transaction record processor service 118 references the policy data store 120 to access the subject rate card or policy, it processes the transaction record according to the updated rate card and/or updated policy.

In an embodiment, the transaction records are introduced into the transaction table 142 with an index or key that is different from a GUID by using a Java persistence API (JPA) generated index or key which circumvents full table scans associated with using a GUID as key. The use of the JPA generated index or key saves the excess time-up to 15 seconds per instance—for adding new entries into the processed transactions table 144. When the transactions record processor 118 experiences an error when processing a transaction record, it stores information about the error in the error table 146 and moves on. The errors stored in the error table 146 may be analyzed by information technology workers at the wireless communication service provider and resolved. Resolution may entail updating the processed transactions table 144 and/or updating software of one or more components of the transaction recording application.

Figure 3A:
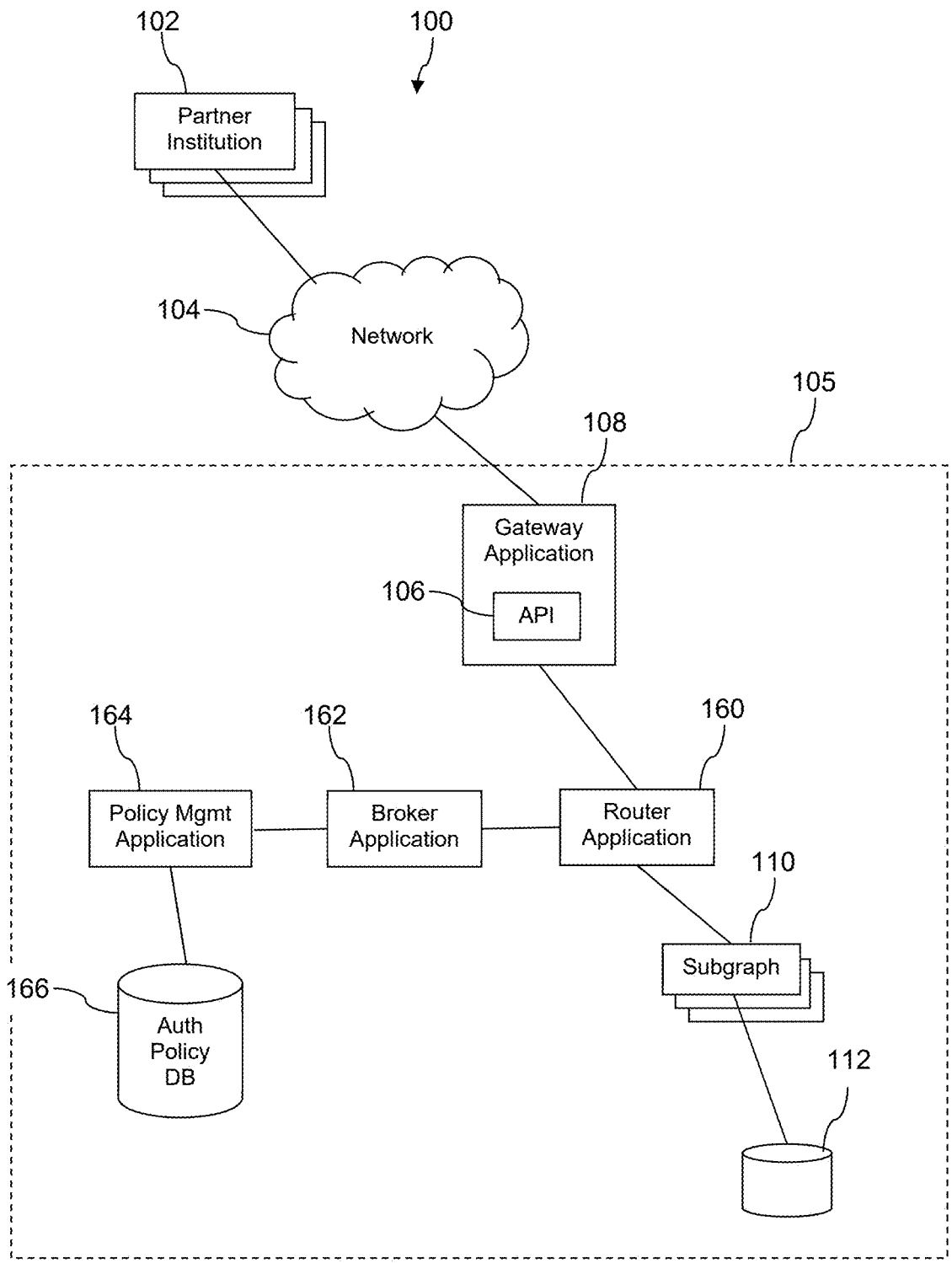
FIG. 3A is block diagram of a policy-based data store access authorization system according to an embodiment of the disclosure.
Figure 3B:
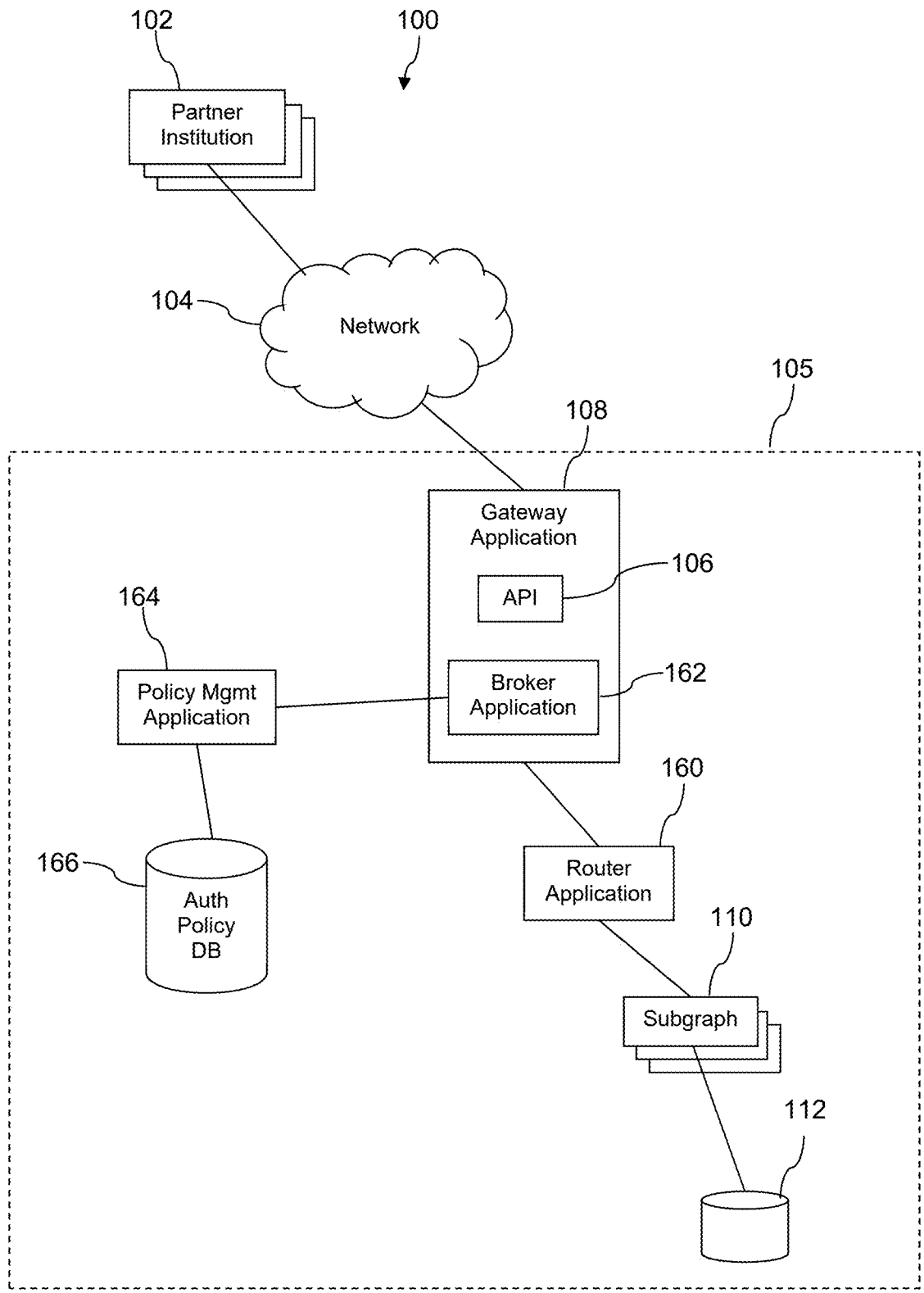
FIG. 3B is a block diagram of another policy-based data store access authorization system according to an embodiment of the disclosure.

Turning now to FIG. 3A and FIG. 3B, a centralized, fine-grained, context-based authorization function of the system 100 is described. In an embodiment, the system 100 further comprises a router application 160 that receives requests to access the subgraphs 110 and the datastore 112 from the gateway application 108 and routes the requests optionally to the subgraphs 110. The router application 160 may be considered to be an orchestration layer that provides access to the subgraphs 110 and the datastore 112. The system 100 further comprises a broker application 162, a policy management application 164, and an authorization policy datastore 166. In an embodiment, the router application 160, the broker application 162, the policy management application 164, and the authorization policy datastore 166 may each be implemented on one or more computer systems. In an embodiment, the policy management application 164 may be an open policy agent (OPA).

The policy management application 164 may read from the authorization policy datastore 166 to learn current centralized, fine-grained, context-based authorization policies. The policy management application 164 may read from the authorization policy datastore 166 periodically, for example once per minute, once every five minutes, once every ten minutes, once every fifteen minutes, once per hour, once every two hours, once every three hours, or some other interval. The policy management application 164 may read only the changes in the policies stored in the authorization policy datastore 166 (e.g., read only "deltas" of policy changes). Alternatively, the policy management application 164 may not read from the authorization policy datastore 166 but may instead subscribe to receive a notification on the event of the authorization policy datastore 166 being updated. In an embodiment, the policy management application 164 may be replaced in the system 100 by another kind of decision-making policy engine application executing on a computer system.

The authorization decision making of the policy management application 164 is updated by updating the definition of the authorization policies contained in the authorization policy datastore 166. Thus, the authorization policies of the system 100 may be easily adapted without having to deploy software updates to the gateway application 108, to router application 160, and/or to the subgraphs 110.

In an embodiment, the policy management application 164 is configured to communicate using JSON inputs and JSON outputs. By contrast, the router application 160, in an embodiment, is not compatible with JSON formatted communications. The broker application 162 is programmed to transform access authorization requests received from the router application 160 (or, as in the embodiment of FIG. 3B, received from the gateway application 108) to access authorization requests expressed in a JSON format, and to send the JSON formatted access authorization request to the policy management application 164. Likewise, the broker application 162 is programmed to transform access authorization decisions formatted in JSON form received from the policy management application 164 into an access authorization enforcement command to be sent to the router application 160 (or, as in the embodiment of FIG. 3B, sent to the gateway application 108).

The broker application 162 is deemed to enforce the authorization decision produced by the policy management application 164. In some contexts, the broker application 162 and/or the computer system it executes on may sometimes be referred to as an external coprocessor. For example, the gateway application 108, the router application 160, the subgraphs 110, and the datastore 112 may be thought to constitute a GraphQL system or a system composed of off-the-shelf applications, and the broker application 162 may be considered architecturally as an external coprocessor relative to those other components of the system. If the policy management application 164 sends an access authorized JSON response to the broker application 162, the broker application 162 sends a modified router request back to the router application 160 indicating approved.

If the policy management application 164 sends an access authorization failure JSON response to the broker application 162, the broker application 162 sends a denied message to the router application 160. In an embodiment, in the access authorization failure case, the broker application 162 sends a break object on the control property to the router application 160. The break object may have a 401 status (e.g., a SIP 401 message) included as well as a fine-grained reason indication or error cause indication. The indication of error cause may be an error code. The break object may comprise a text content that can be provided back to the partner institution 102. When the router application 160 (or the gateway application 108 in the case of the architecture of FIG. 3B) receives the break object, an access denied response is returned to the partner institution 102. Notably, when an access denied response is returned, the subgraphs 110 are not burdened in any way by the failed request. This increases the general level of security in the system 100 and also increases efficiency, in that the subgraphs 110 do not need to do anything in the case of an unauthorized access request. In an embodiment, the functionality of the gateway application 108 and the router application 160 may be integrated into a single application.

The authorization policies stored in the authorization policy datastore 166 define authorized levels of access to the subgraphs 110 and the data store in the datastore 112. The policies can authorize different data access operations and distinguish between requests for different access operations. The data access operations may comprise a read operation and a write operation. The data access operations may comprise a subscription operation, a query operation, and a mutation operation. The policies can authorize based on type of data requested to be accessed—for example a subscriber data type of data or a bill data type of data. The policies can authorize based on field of data requested. Different fields may be defined for different types of data. As an example, subscriber data type fields may comprise a subscriber first name, a subscriber last name, a subscriber address, a subscriber date of on-boarding. The authorization policies may be said to constitute multi-level authorization policies including operation level type policies, type level policies, and field level policies. Authorization policies can grant or deny access based further on an identity of a partner institution and/or a partner institution sub-group or division.

Authorization policies may be defined via the policy API 122. In an embodiment, only employees of the wireless communication service provider may be granted access to add or modify authorization policies by the policy API 122. In another embodiment, however, one or more partner institutions 102 may be granted access to add of modify authorization policies by the policy API 122. In an embodiment, authorization policies stored in the authorization policy datastore 166 are defined in a Rego language. Rego is a datastore or database query language that supports structured document models. In another embodiment, authorization policies stored in the authorization policy data store 166 are defined in a Yet Another Markup Language (YAML) language.

As illustrated in FIG. 3B, the broker application 162 may be integrated into the gateway application 108. In this case, access requests from the partner institutions 102 that are denied are not passed on to the router application 160, reducing the processing burden on the router application 160.

Figure 4:
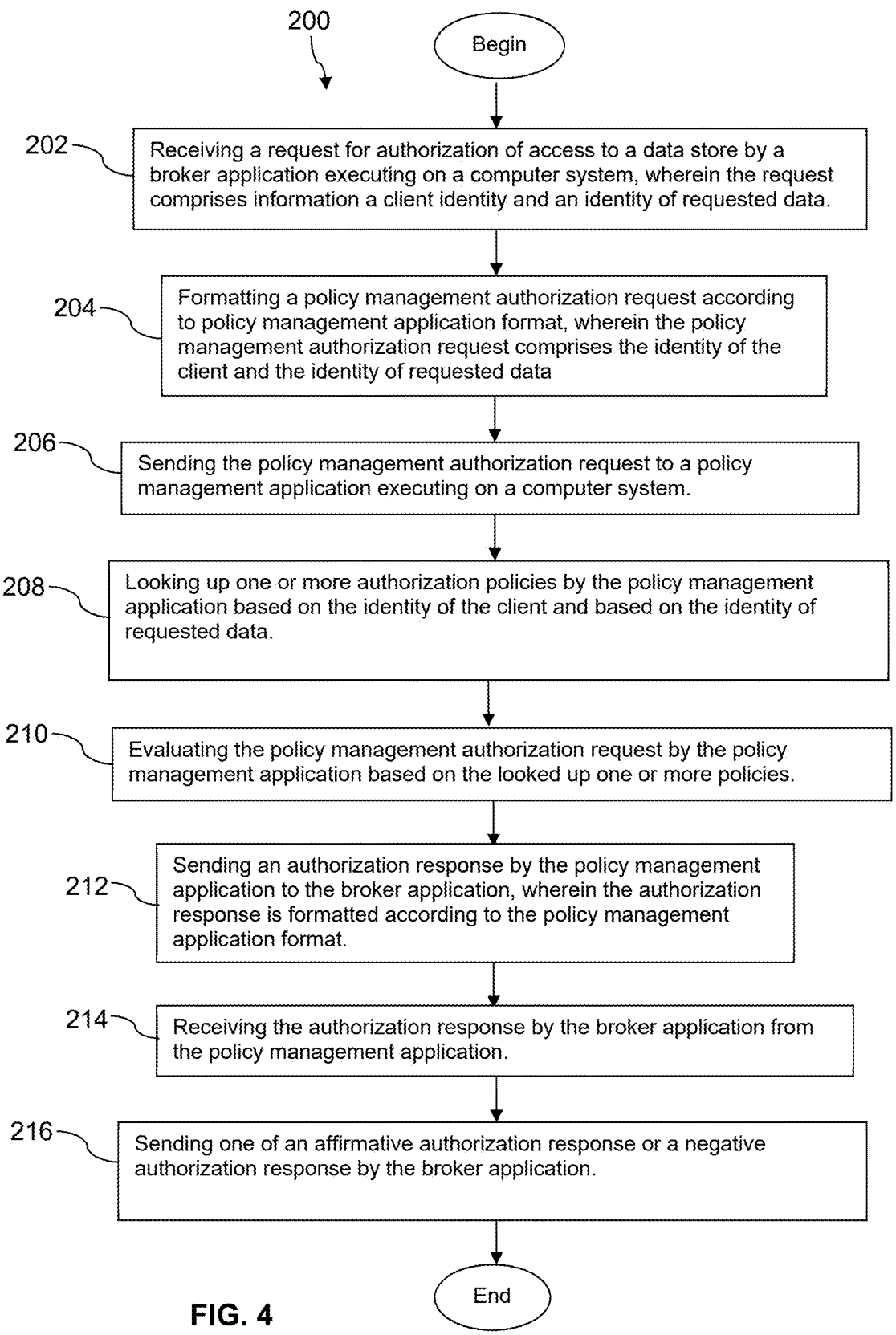
FIG. 4 is a flow chart of a method according to an embodiment of the disclosure.

Turning now to FIG. 4, a method 200 is described. In an embodiment, the method 200 is a method of providing centralized policy-based authorization for access to a data store. At block 202, the method 200 comprises receiving a request for authorization of access to a data store by a broker application executing on a computer system, wherein the request comprises information a client identity and an identity of requested data.

At block 204, the method 200 comprises formatting a policy management authorization request according to a policy management application format, wherein the policy management authorization request comprises the identity of the client and the identity of requested data. In an embodiment, the policy management application format is a JSON format. At block 206, the method 200 comprise sending the policy management authorization request to an policy management application executing on a computer system.

At block 208, the method 200 comprises looking up one or more authorization policies by the policy management application based on the identity of the client and based on the identity of requested data. In an embodiment, the authorization policies are defined in a rego data store query language format. In an embodiment, the authorization policies are defined in a YAML language format. At block 210, the method 200 comprises evaluating the policy management authorization request by the policy management application based on the looked up one or more policies.

At block 212, the method 200 comprises sending an authorization response by the policy management application to the broker application, wherein the authorization response is formatted according to the policy management application format. At block 214, the method comprises receiving the authorization response by the broker application from the policy management application. At block 216, the method 200 comprises sending one of an affirmative authorization response or a negative authorization response by the broker application. In an embodiment, a negative authorization response is sent by the broker application in the form of a break object, wherein the break object identifies an error cause. The break object may identify a SIP 401 message. In an embodiment, the break object may comprise a message content that may be forwarded back to a partner institution 102 for display. In an embodiment, the break object may comprise an error code. In an embodiment, the broker application and the policy management application are executed in a containerized application virtualization environment (e.g., a Kubernetes pod).

Figure 5:
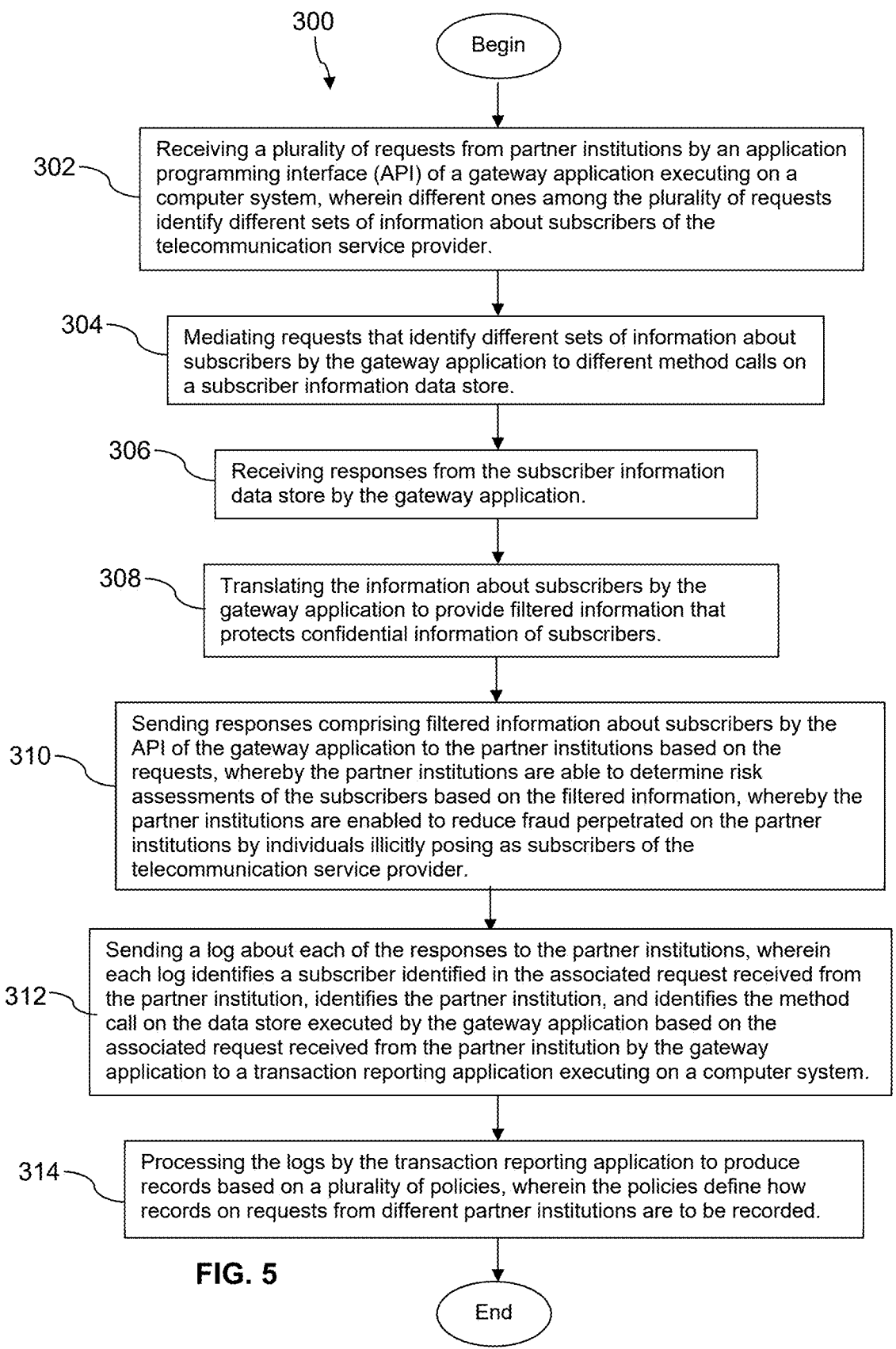
FIG. 5 is a flow chart of another method according to an embodiment of the disclosure.

Turning to FIG. 5, a method 300 is described. In an embodiment, the method 300 is a method of fraud prevention supported by providing information on subscribers by a telecommunication service provider based on subscriber accounts. At block 302, the method 300 comprises receiving a plurality of requests from partner institutions by an application programming interface (API) of a gateway application executing on a computer system, wherein different ones among the plurality of requests identify different sets of information about subscribers of the telecommunication service provider.

At block 304, the method 300 comprises mediating requests that identify different sets of information about subscribers by the gateway application to different method calls on a subscriber information data store. In an embodiment, the subscriber information data store is implemented as a federated GraphQL API management system. In an embodiment, the different methods calls are associated with different subgraphs of a federated GraphQL API management system. In an embodiment, the different sets of information about subscribers comprise between 10 and 20 fields of information about subscribers. In an embodiment, the different sets of information about subscribers comprise between 20 and 35 fields of information about subscribers. In an embodiment, the different sets of information about subscribers comprise between 20 and 50 fields of information about subscribers. In an embodiment, the different sets of information about subscribers comprise between 50 and 100 fields of information about subscribers. At block 306, the method 300 comprises receiving responses from the subscriber information data store by the gateway application.

At block 308, the method 300 comprises translating the information about subscribers by the gateway application to provide filtered information that protects confidential information of subscribers. In an embodiment, the filtered information comprises information indicating a subscriber account is active, suspended, or canceled. In an embodiment, the filtered information comprises information indicating whether a phone associated to a subscriber is recorded as lost or stolen. In an embodiment, the filtered information comprises information indicating whether a phone associated with the subscriber is in a call forwarding mode of operation. In an embodiment, the filtered information comprises information indicating when an international mobile equipment identity (IMEI) of a phone associated to a subscriber was put into service.

At block 310, the method 300 comprises sending responses comprising filtered information about subscribers by the API of the gateway application to the partner institutions based on the requests, whereby the partner institutions are able to determine risk assessments of the subscribers based on the filtered information, whereby the partner institutions are enabled to reduce fraud perpetrated on the partner institutions by individuals illicitly posing as subscribers of the telecommunication service provider.

At block 312, the method 300 comprises sending a log about each of the responses to the partner institutions, wherein each log identifies a subscriber identified in the associated request received from the partner institution, identifies the partner institution, and identifies the method call on the data store executed by the gateway application based on the associated request received from the partner institution by the gateway application to a transaction recording application executing on a computer system. At block 314, the method 300 comprises processing the logs by the transaction recording application to produce records based on a plurality of policies, wherein the policies define how records on requests from different partner institutions are to be recorded. In an embodiment, processing the logs by the transaction recording application is performed asynchronously with reference to the sending responses to the partner institutions. In an embodiment, processing the logs by the transaction recording application comprises storing transaction records in a transactions table in a transaction record data store based on a non-GUID index that is generated using a Java persistence API.

Figure 6A:
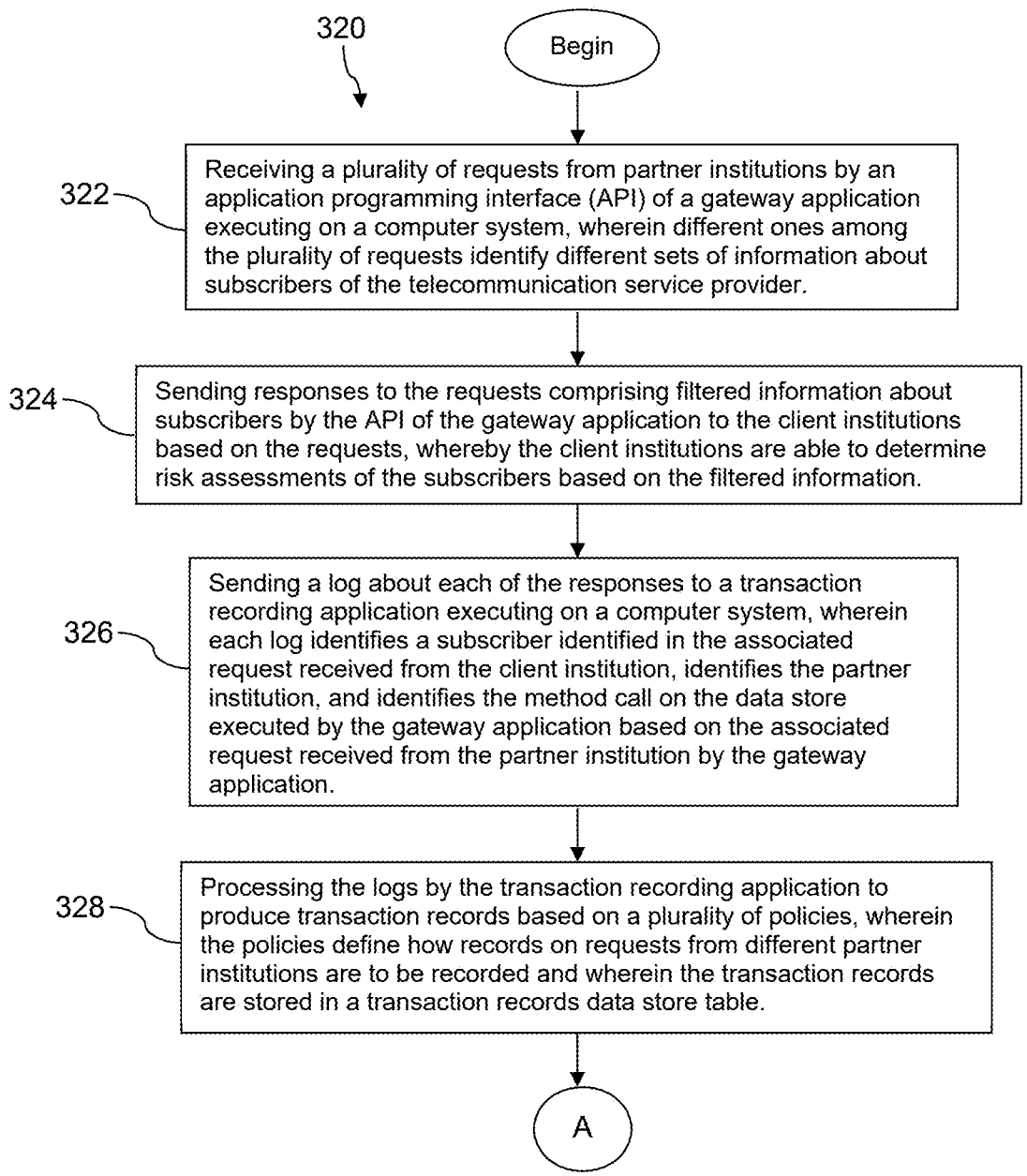
FIG. 6A and FIG. 6B is a flow chart of yet another method according to an embodiment of the disclosure.
Figure 6B:
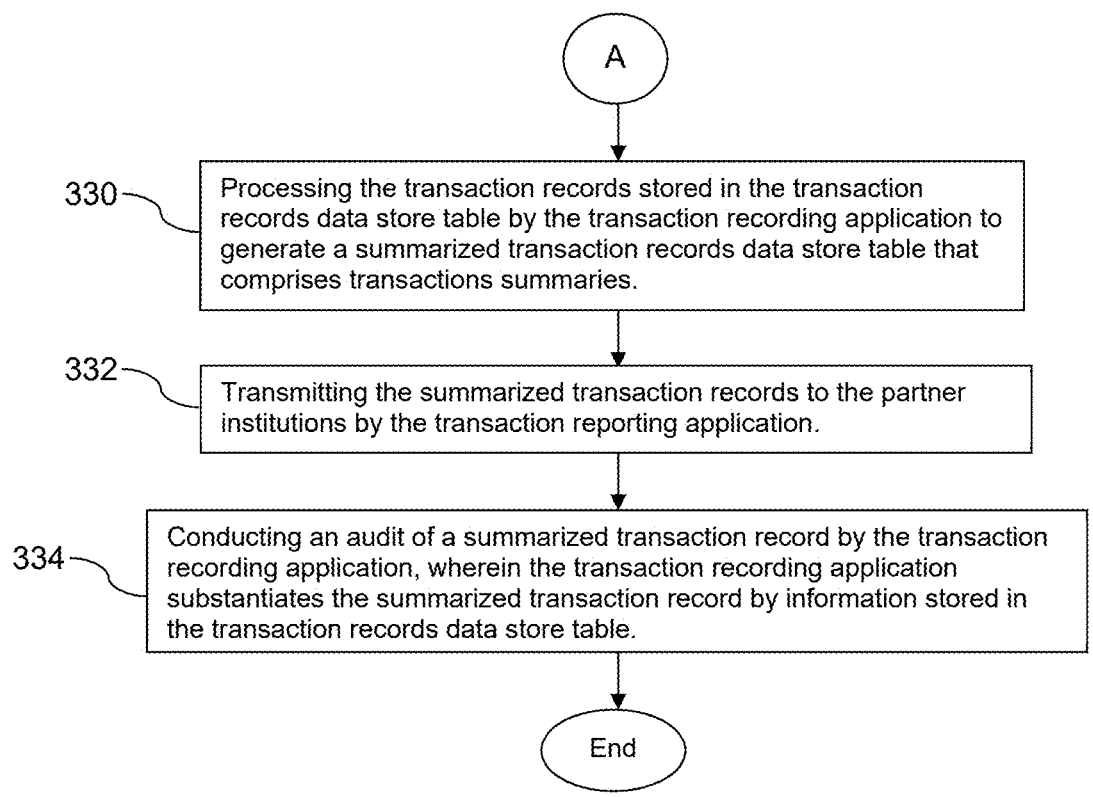

Turning now to FIG. 6A and FIG. 6B, a method 320 is described. In an embodiment, the method 320 is a method of providing information on subscribers by a telecommunication service provider based on subscriber accounts. At block 322, the method 320 comprises receiving a plurality of requests from partner institutions by an application programming interface (API) of a gateway application executing on a computer system, wherein different ones among the plurality of requests identify different sets of information about subscribers of the telecommunication service provider.

At block 324, the method 320 comprises sending responses to the requests comprising filtered information about subscribers by the API of the gateway application to the partner institutions based on the requests, whereby the partner institutions are able to determine risk assessments of the subscribers based on the filtered information. At block 326, the method 320 comprises sending a log about each of the responses to a transaction recording application executing on a computer system, wherein each log identifies a subscriber identified in the associated request received from the partner institution, identifies the partner institution, and identifies the method call on the data store executed by the gateway application based on the associated request received from the partner institution by the gateway application.

At block 328, the method 320 comprises processing the logs by the transaction recording application to produce transaction records based on a plurality of policies, wherein the policies define how records on requests from different partner institutions are to be recorded and wherein the transaction records are stored in a transaction records data store table. In an embodiment, the policies are defined at least in part by rate cards. In an embodiment, the rate cards are processed by the transaction recording application sequentially to produce the transaction records. In an embodiment, different rate cards are indexed by a partner institution, a sub-group within the partner institution, and a set of information about subscribers. In an embodiment, the rate cards are implemented in JSON files. Turning now to FIG. 6B, at block 330, the method 320 comprises processing the transaction records stored in the transaction records data store table by the transaction recording application to generate a summarized transaction records data store table that comprises transactions summaries.

At block 332, the method 320 comprises transmitting the summarized transaction records to the partner institutions by the transaction recording application. At block 334, the method 230 comprises conducting an audit of a summarized transaction record by the transaction recording application, wherein the transaction recording application substantiates the summarized transaction record by information stored in the transaction records data store table. In an embodiment, the gateway application responds to requests from partner institutions synchronously and the transaction recording application processes the logs asynchronously.

Figure 7A:
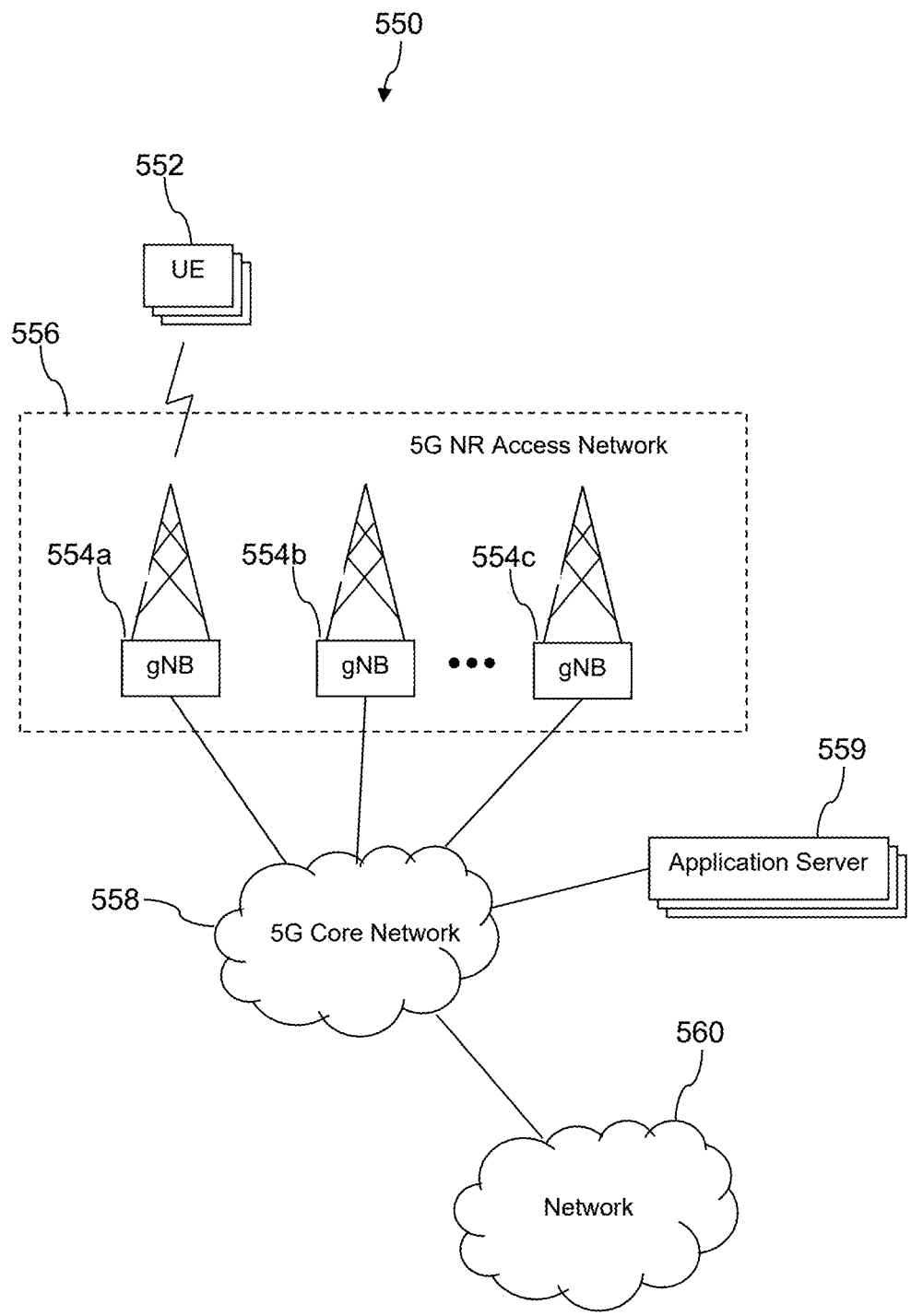
FIG. 7A and FIG. 7B is a block diagram of a communication network according to an embodiment of the disclosure.

Turning now to FIG. 7A, an exemplary communication system 550 is described. Typically, the communication system 550 includes a number of access nodes 554 that are configured to provide coverage in which UEs 552 such as cell phones, tablet computers, machine-type-communication devices, tracking devices, embedded wireless modules, and/or other wirelessly equipped communication devices (whether or not user operated), can operate. The access nodes 554 may be said to establish an access network 556. The access network 556 may be referred to as a radio access network (RAN) in some contexts. In a 5G technology generation an access node 554 may be referred to as a next Generation Node B (gNB). In 4G technology (e.g., long-term evolution (LTE) technology) an access node 554 may be referred to as an evolved Node B (eNB). In 3G technology (e.g., code division multiple access (CDMA) and global system for mobile communication (GSM)) an access node 554 may be referred to as a base transceiver station (BTS) combined with a base station controller (BSC). In some contexts, the access node 554 may be referred to as a cell site or a cell tower. In some implementations, a picocell may provide some of the functionality of an access node 554, albeit with a constrained coverage area. Each of these different embodiments of an access node 554 may be considered to provide roughly similar functions in the different technology generations.

In an embodiment, the access network 556 comprises a first access node 554a, a second access node 554b, and a third access node 554c. It is understood that the access network 556 may include any number of access nodes 554. Further, each access node 554 could be coupled with a core network 558 that provides connectivity with various application servers 559 and/or a network 560. In an embodiment, at least some of the application servers 559 may be located close to the network edge (e.g., geographically close to the UE 552 and the end user) to deliver so-called "edge computing." The network 560 may be one or more private networks, one or more public networks, or a combination thereof. The network 560 may comprise the public switched telephone network (PSTN). The network 560 may comprise the Internet. With this arrangement, a UE 552 within coverage of the access network 556 could engage in air-interface communication with an access node 554 and could thereby communicate via the access node 554 with various application servers and other entities.

The communication system 550 could operate in accordance with a particular radio access technology (RAT), with communications from an access node 554 to UEs 552 defining a downlink or forward link and communications from the UEs 552 to the access node 554 defining an uplink or reverse link. Over the years, the industry has developed various generations of RATs, in a continuous effort to increase available data rate and quality of service for end users. These generations have ranged from "1G," which used simple analog frequency modulation to facilitate basic voice-call service, to "4G"-such as Long-Term Evolution (LTE), which now facilitates mobile broadband service using technologies such as orthogonal frequency division multiplexing (OFDM) and multiple input multiple output (MIMO).

Recently, the industry has been exploring developments in "5G" and particularly "5G NR" (5G New Radio), which may use a scalable OFDM air interface, advanced channel coding, massive MIMO, beamforming, mobile mmWave (e.g., frequency bands above 24 GHz), and/or other features, to support higher data rates and countless applications, such as mission-critical services, enhanced mobile broadband, and massive Internet of Things (IoT). 5G is hoped to provide virtually unlimited bandwidth on demand, for example providing access on demand to as much as 20 gigabits per second (Gbps) downlink data throughput and as much as 10 Gbps uplink data throughput. Due to the increased bandwidth associated with 5G, it is expected that the new networks will serve, in addition to conventional cell phones, general internet service providers for laptops and desktop computers, competing with existing ISPs such as cable internet, and also will make possible new applications in internet of things (IoT) and machine to machine areas.

In accordance with the RAT, each access node 554 could provide service on one or more radio-frequency (RF) carriers, each of which could be frequency division duplex (FDD), with separate frequency channels for downlink and uplink communication, or time division duplex (TDD), with a single frequency channel multiplexed over time between downlink and uplink use. Each such frequency channel could be defined as a specific range of frequency (e.g., in radio-frequency (RF) spectrum) having a bandwidth and a center frequency and thus extending from a low-end frequency to a high-end frequency. Further, on the downlink and uplink channels, the coverage of each access node 554 could define an air interface configured in a specific manner to define physical resources for carrying information wirelessly between the access node 554 and UEs 552.

Without limitation, for instance, the air interface could be divided over time into frames, subframes, and symbol time segments, and over frequency into subcarriers that could be modulated to carry data. The example air interface could thus define an array of time-frequency resource elements each being at a respective symbol time segment and subcarrier, and the subcarrier of each resource element could be modulated to carry data. Further, in each subframe or other transmission time interval (TTI), the resource elements on the downlink and uplink could be grouped to define physical resource blocks (PRBs) that the access node could allocate as needed to carry data between the access node and served UEs 552.

In addition, certain resource elements on the example air interface could be reserved for special purposes. For instance, on the downlink, certain resource elements could be reserved to carry synchronization signals that UEs 552 could detect as an indication of the presence of coverage and to establish frame timing, other resource elements could be reserved to carry a reference signal that UEs 552 could measure in order to determine coverage strength, and still other resource elements could be reserved to carry other control signaling such as PRB-scheduling directives and acknowledgement messaging from the access node 554 to served UEs 552. And on the uplink, certain resource elements could be reserved to carry random access signaling from UEs 552 to the access node 554, and other resource elements could be reserved to carry other control signaling such as PRB-scheduling requests and acknowledgement signaling from UEs 552 to the access node 554

The access node 554, in some instances, may be split functionally into a radio unit (RU), a distributed unit (DU), and a central unit (CU) where each of the RU, DU, and CU have distinctive roles to play in the access network 556. The RU provides radio functions. The DU provides L1 and L2 real-time scheduling functions; and the CU provides higher L2 and L3 non-real time scheduling. This split supports flexibility in deploying the DU and CU. The CU may be hosted in a regional cloud data center. The DU may be co-located with the RU, or the DU may be hosted in an edge cloud data center.

Figure 7B:
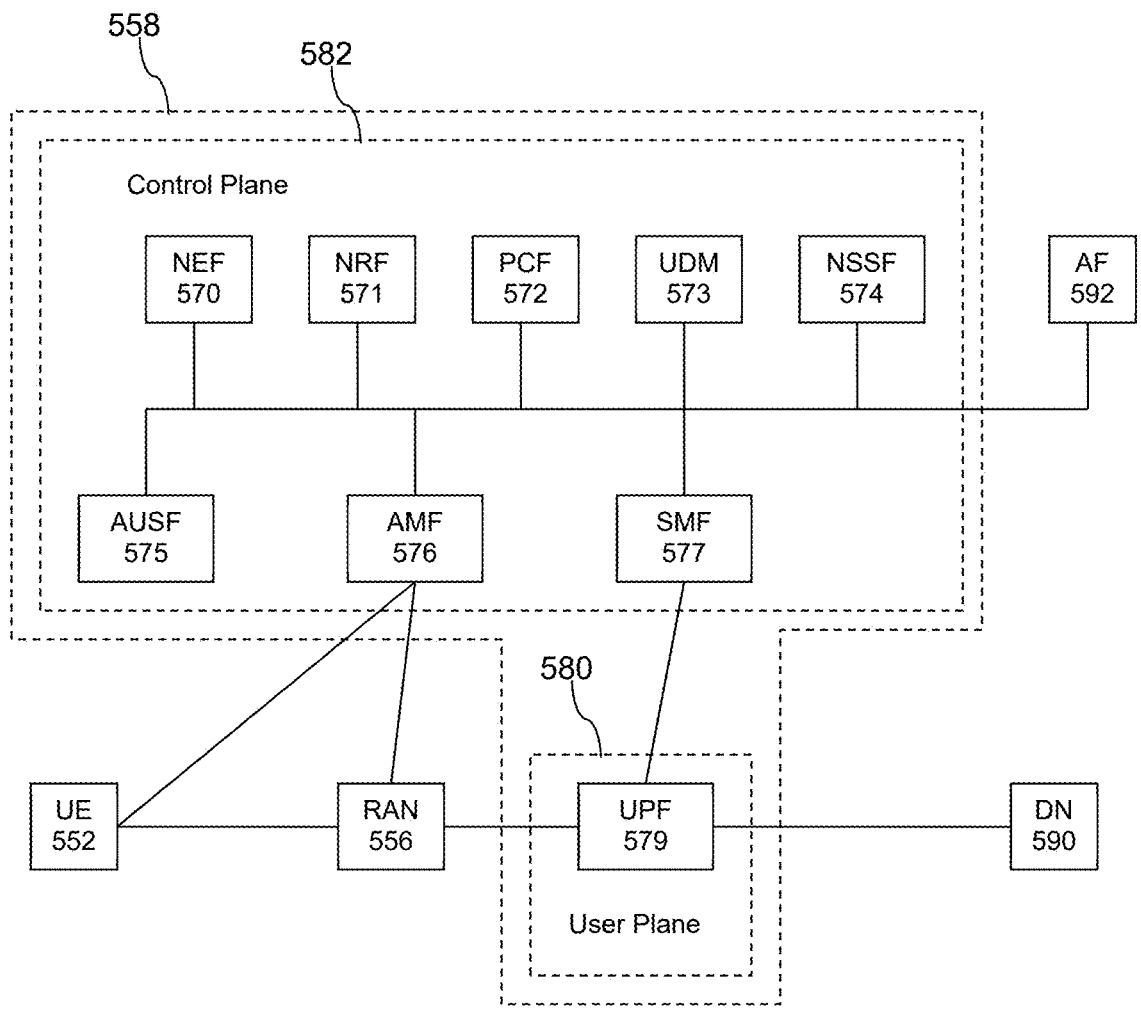

Turning now to FIG. 7B, further details of the core network 558 are described. In an embodiment, the core network 558 is a 5G core network. 5G core network technology is based on a service-based architecture paradigm. Rather than constructing the 5G core network as a series of special purpose communication nodes (e.g., an HSS node, a MME node, etc.) running on dedicated server computers, the 5G core network is provided as a set of services or network functions. These services or network functions can be executed on virtual servers in a cloud computing environment which supports dynamic scaling and avoidance of long-term capital expenditures (fees for use may substitute for capital expenditures). These network functions can include, for example, a user plane function (UPF) 579, an authentication server function (AUSF) 575, an access and mobility management function (AMF) 576, a session management function (SMF) 577, a network exposure function (NEF) 570, a network repository function (NRF) 571, a policy control function (PCF) 572, a unified data management (UDM) 573, a network slice selection function (NSSF) 574, and other network functions. The network functions may be referred to as virtual network functions (VNFs) in some contexts.

Network functions may be formed by a combination of small pieces of software called microservices. Some microservices can be re-used in composing different network functions, thereby leveraging the utility of such microservices. Network functions may offer services to other network functions by extending application programming interfaces (APIs) to those other network functions that call their services via the APIs. The 5G core network 558 may be segregated into a user plane 580 and a control plane 582, thereby promoting independent scalability, evolution, and flexible deployment.

The UPF 579 delivers packet processing and links the UE 552, via the access network 556, to a data network 590 (e.g., the network 560 illustrated in FIG. 7A). The AMF 576 handles registration and connection management of non-access stratum (NAS) signaling with the UE 552. Said in other words, the AMF 576 manages UE registration and mobility issues. The AMF 576 manages reachability of the UEs 552 as well as various security issues. The SMF 577 handles session management issues. Specifically, the SMF 577 creates, updates, and removes (destroys) protocol data unit (PDU) sessions and manages the session context within the UPF 579. The SMF 577 decouples other control plane functions from user plane functions by performing dynamic host configuration protocol (DHCP) functions and IP address management functions. The AUSF 575 facilitates security processes.

The NEF 570 securely exposes the services and capabilities provided by network functions. The NRF 571 supports service registration by network functions and discovery of network functions by other network functions. The PCF 572 supports policy control decisions and flow-based charging control. The UDM 573 manages network user data and can be paired with a user data repository (UDR) that stores user data such as customer profile information, customer authentication number, and encryption keys for the information. An application function 592, which may be located outside of the core network 558, exposes the application layer for interacting with the core network 558. In an embodiment, the application function 592 may be execute on an application server 559 located geographically proximate to the UE 552 in an "edge computing" deployment mode. The core network 558 can provide a network slice to a subscriber, for example an enterprise customer, that is composed of a plurality of 5G network functions that are configured to provide customized communication service for that subscriber, for example to provide communication service in accordance with communication policies defined by the customer. The NSSF 574 can help the AMF 576 to select the network slice instance (NSI) for use with the UE 552.

Figure 8:
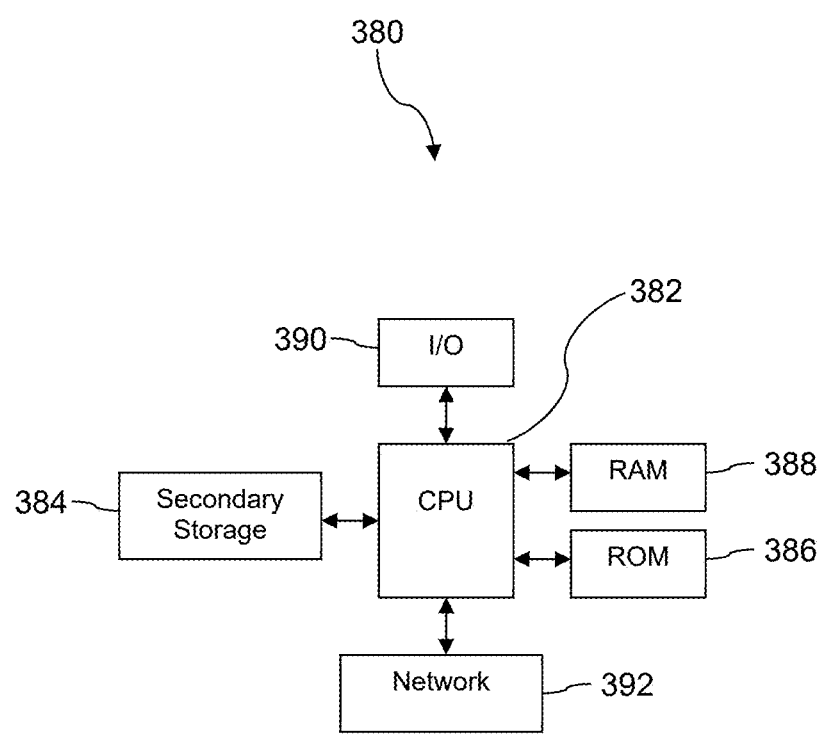
FIG. 8 is a block diagram of a computer system according to an embodiment of the disclosure.

FIG. 8 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC) and radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk-based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

ADDITIONAL EMBODIMENTS

The following are non-limiting, specific embodiments in accordance with the present disclosure:

A first embodiment, which is a method of fraud prevention supported by providing information on subscribers by a telecommunication service provider based on subscriber account that comprises receiving a plurality of requests from partner institutions by an application programming interface (API) of a gateway application executing on a computer system, wherein different ones among the plurality of requests identify different sets of information about subscribers of the telecommunication service provider; mediating requests that identify different sets of information about subscribers by the gateway application to different method calls on a subscriber information data store; receiving responses from the subscriber information data store by the gateway application; translating the information about subscribers by the gateway application to provide filtered information that protects confidential information of subscribers; sending responses comprising filtered information about subscribers by the API of the gateway application to the partner institutions based on the requests, whereby the partner institutions are able to determine risk assessments of the subscribers based on the filtered information, whereby the partner institutions are enabled to reduce fraud perpetrated on the partner institutions by individuals illicitly posing as subscribers of the telecommunication service provider; sending a log about each of the responses to the partner institutions, wherein each log identifies a subscriber identified in the associated request received from the partner institution, identifies the partner institution, and identifies the method call on the data store executed by the gateway application based on the associated request received from the partner institution by the gateway application to a transaction recording application executing on a computer system; and processing the logs by the transaction recording application to produce records based on a plurality of policies, wherein the policies define how records on requests from different partner institutions are to be recorded.

A second embodiment, which is the method of the first embodiment, wherein the different sets of information about subscribers comprise between 20 and 50 fields of information about subscribers.

A third embodiment, which is the method of the first embodiment, wherein the different sets of information about subscribers comprise between 50 and 100 fields of information about subscribers.

A fourth embodiment, which is the method of any of the first through the third embodiment, wherein the different method calls are associated with different subgraphs of a federated GraphQL API management system.

A fifth embodiment, which is the method of any of the first through the fourth embodiment, wherein the filtered information comprises information indicating a subscriber account is active, suspended, or canceled.

A sixth embodiment, which is the method of any of the first through the fifth embodiment, wherein the filtered information comprises information indicating whether a phone associated to a subscriber is recorded as lost or stolen.

A seventh embodiment, which is the method of any of the first through the sixth embodiment, wherein processing the logs by the transaction recording application is performed asynchronously with reference to the sending responses to the partner institutions.

An eighth embodiment, which is the method of any of the first through the seventh embodiment, wherein processing the logs by the transaction recording application comprises storing transaction records in a transactions table in a transaction record data store based on a non-GUID index that is generated using a Java persistence API.

A ninth embodiment, which is a system for providing information on subscribers by a telecommunication service provider based on subscriber accounts comprising an at least one processor; a non-transitory memory; a gateway application stored in the non-transitory memory that, when executed by the at least one processor, extends an application programming interface (API) to a plurality of partner institutions, receives a plurality of requests from partner institutions via the API, wherein different ones among the plurality of requests identify different sets of information about subscribers of the telecommunication service provider, translates the information about subscribers to provide filtered information that protects confidential information of subscribers, sends responses comprising the filtered information about subscribers via the API to the partner institutions based on the requests, whereby the partner institutions are able to determine risk assessments of the subscribers based on the filtered information, whereby the partner institutions are enabled to reduce fraud perpetrated on the partner institutions by individuals illicitly posing as subscribers of the telecommunication service provider, and sends a log about each of the responses to the partner institutions to a transaction recording application, wherein each log identifies a subscriber identified in the associated request received from the partner institution, identifies the partner institution, and identifies the method call on the data store executed by the gateway application based on the associated request received from the partner institution by the gateway application; and the transaction recording application stored in the non-transitory memory that, when executed by the processor processes the logs by the transaction recording application to produce records based on a plurality of policies, wherein the policies define how records on requests from different partner institutions are to be recorded.

A tenth embodiment, which is the system of the ninth embodiment, wherein the gateway application maps requests received through the API to calls to a plurality of different APIs of a subscriber information data store.

An eleventh embodiment, which is the system of the ninth or the tenth embodiment, wherein the subscriber information data store is accessed through a federated GraphQL API and the gateway application maps requests received through the API to calls to a plurality of different GraphQL subgraphs of the data store.

A twelfth embodiment, which is the system of any of the ninth through the eleventh embodiment, wherein the plurality of policies comprise a plurality of rate cards.

A thirteenth embodiment, which is the system of the twelfth embodiment, wherein the rate cards are implemented as JSON files.

A fourteenth embodiment, which is the system of any of the ninth through the thirteenth embodiment, wherein the transaction recording application stores transaction records in a first transactions table in a records data store, processes the transaction records to produce processed transactions stored in a processed transactions table in the records data store, and periodically reviews processed transactions to produce transactions summaries stored in a summary table in the records data store.

A fifteenth embodiment, which is a method of providing information on subscribers by a telecommunication service provider based on subscriber accounts that comprises receiving a plurality of requests from partner institutions by an application programming interface (API) of a gateway application executing on a computer system, wherein different ones among the plurality of requests identify different sets of information about subscribers of the telecommunication service provider; sending responses to the requests comprising filtered information about subscribers by the API of the gateway application to the partner institutions based on the requests, whereby the partner institutions are able to determine risk assessments of the subscribers based on the filtered information; sending a log about each of the responses to a transaction recording application executing on a computer system, wherein each log identifies a subscriber identified in the associated request received from the partner institution, identifies the partner institution, and identifies the method call on the data store executed by the gateway application based on the associated request received from the partner institution by the gateway application; processing the logs by the transaction recording application to produce transaction records based on a plurality of policies, wherein the policies define how records on requests from different partner institutions are to be recorded and wherein the transaction records are stored in a transaction records data store table; processing the transaction records stored in the transaction records data store table by the transaction recording application to generate a summarized transaction records data store table that comprises transactions summaries; transmitting the summarized transaction records to the partner institutions by the transaction recording application; and conducting an audit of a summarized transaction record by the transaction recording application, wherein the transaction recording application substantiates the summarized transaction record by information stored in the transaction records data store table.

A sixteenth embodiment, which is the method of the fifteenth embodiment, wherein the gateway application responds to requests from partner institutions synchronously and the transaction recording application processes the logs asynchronously.

A seventeenth embodiment, which is the method of the fifteenth embodiment or the sixteenth embodiment, wherein the policies are defined at least in part by rate cards.

An eighteenth embodiment, which is the method of the seventeenth embodiment, wherein the rate cards are processed by the transaction recording application sequentially to produce the transaction records.

A nineteenth embodiment, which is the method of seventeenth or eighteenth embodiment, wherein different rate cards are indexed by a partner institution, a sub-group within the partner institution, and a set of information about subscribers.

A twentieth embodiment, which is the method of any of the seventeenth through the nineteenth embodiments, wherein the rate cards are implemented in JSON files.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A system for providing centralized policy-based authorization for access to a data store, comprising:
   a data store, wherein the data store is accessed by a plurality of GraphQL subgraphs;
   an at least one processor;
   a non-transitory memory, wherein the non-transitory memory comprises a plurality of multi-level authorization policy definitions that define access to the data store based on client identities, based on operations, based on data types, and based on fields;
   a router application stored in the non-transitory memory that, when executed by the at least one processor,
      receives requests to perform operations on the data store from client applications,
      sends information about the requests to a broker application,
      receives authorization decisions from the broker application,
      for a first plurality of the received requests to perform operations that are associated with affirmative authorization decisions, sends the received requests on to a GraphQL subgraph of the data store, and for a second plurality of the received requests to perform operations that are associated with negative authorization decisions, sends request denial messages to the associated client applications;

the broker application stored in the non-transitory memory that, when executed by the at least one processor, receives the information about the requests to perform operations on the data store from the router application, formats authorization requests in a policy management application format, wherein the authorization requests comprise information identifying client applications and requested data, sends the authorization requests to a policy management application, receives affirmative authorization decisions from the policy management application for the first plurality of the received requests to perform operations, sends affirmative authorization decisions for the first plurality of received requests to perform operations to the router application, receives negative authorization decisions from the policy management application for the second plurality of received requests to perform operations, and sends negative authorization decisions for the second plurality of received requests to perform operations to the router application; and a policy management application stored in the non-transitory memory that, when executed by the at least one processor, receives requests to authorize requests from the broker application, analyzes each of the authorization requests based on the client applications and requested data and based on the plurality of authorization policy definitions, sends affirmative authorization decisions associated with the first plurality of received requests to perform operations to the broker application, and sends negative authorization decisions associated with the second plurality of received requests to perform operations to the broker application.

2. The system of claim 1, wherein the data store is a federated data store.

3. The system of claim 1, wherein the multi-level authorization policy definitions are defined using a Rego data store query language.

4. The system of claim 1, wherein the multi-level authorization policy definitions are defined using a Yet Another Markup Language (YAML) language.

5. The system of claim 1, wherein the authorization requests sent by the broker application to the policy management application are in a JSON format.

6. The system of claim 1, wherein the broker application sends negative authorization decisions for the second plurality of received requests to perform operations in the form of break objects.

7. The system of claim 6, wherein the break objects comprise an error code that identifies the cause of the negative authorization decisions.

8. A method of providing centralized policy-based authorization for access to a data store, comprising:

receiving a request for authorization of access to a data store by a broker application executing on a computer system, wherein the request comprises information including a client identity and an identity of requested data;

formatting a policy management authorization request according to a policy management application format, wherein the policy management authorization request comprises the identity of the client and the identity of requested data;

sending the policy management authorization request to a policy management application executing on a computer system;

looking up one or more authorization policies by the policy management application based on the identity of the client and based on the identity of requested data;

evaluating the policy management authorization request by the policy management application based on the looked up one or more policies;

sending an authorization response by the policy management application to the broker application, wherein the authorization response is formatted according to the policy management application format;

receiving the authorization response by the broker application from the policy management application; and sending one of an affirmative authorization response or a negative authorization response by the broker application.

9. The method of claim 8, wherein the policy management application format is a JSON format.

10. The method of claim 8, wherein the authorization policies are defined in a rego data store query language format.

11. The method of claim 8, wherein the authorization policies are defined in a Yet Another Markup Language (YAML) language format.

12. The method of claim 8, wherein a negative authorization response is sent by the broker application in the form of a break object, wherein the break object identifies an error cause.

13. The method of claim 8, wherein the broker application and the policy management application are executed in a containerized application virtualization environment.

14. A system for providing centralized policy-based authorization for access to a data store, comprising:

a data store;

an at least one processor;

a non-transitory memory, wherein the non-transitory memory comprises a plurality of authorization policy definitions;

a gateway application stored in the non-transitory memory that, when executed by the at least one processor, receives requests to perform operations on the data store from client applications, sends information about the requests to a broker application, receives authorization decisions from the broker application, for a first plurality of the received requests to perform operations that are associated with affirmative authorization decisions, sends the received requests on to the data store, and for a second plurality of the received requests to perform operations that are associated with negative authorization decisions, sends request denial messages to the associated client applications;

the broker application stored in the non-transitory memory that, when executed by the at least one processor, receives the information about the requests to perform operations on the data store from the gateway application, formats authorization requests in a policy management application format, wherein the authorization requests comprise information identifying client applications and requested data, sends the authorization requests to a policy management application, receives affirmative authorization decisions from the policy management application for the first plurality of the received requests to perform operations, sends affirmative authorization decisions for the first plurality of received requests to perform operations to the gateway application, receives negative authorization decisions from the policy management application for the second plurality of received requests to perform operations, and sends negative authorization decisions for the second plurality of received requests to perform operations to the gateway application; and a policy management application stored in the non-transitory memory that, when executed by the at least one processor, receives requests to authorize requests from the broker application, analyzes each of the authorization requests based on the client applications and requested data and based on the plurality of authorization policy definitions, sends affirmative authorization decisions associated with the first plurality of received requests to perform operations to the broker application, and sends negative authorization decisions associated with the second plurality of received requests to perform operations to the broker application.

15. The system of claim 14, wherein the client applications are risk assessment applications that determine risk assessments related to subscribers of a wireless communication service provider attempting to open accounts with partner institutions that operate the risk assessment applications.

16. The system of claim 14, wherein the gateway application sends the received requests associated with affirmative authorization decisions on to the data store via a router.

17. The system of claim 14, wherein the authorization policy definitions are defined in a Rego data store query language format.

18. The system of claim 14, defined in a Yet Another Markup Language (YAML) language format.

19. The system of claim 14, wherein the data store is a federated data store.

20. The system of claim 14, wherein the broker application sends the authorization requests to the policy management application in JSON format.

* * * * *